Feb. 6, 1945.   R. N. EUBANK   2,369,033
METHOD OF RECONDITIONING DRY CELLS
Filed April 12, 1943
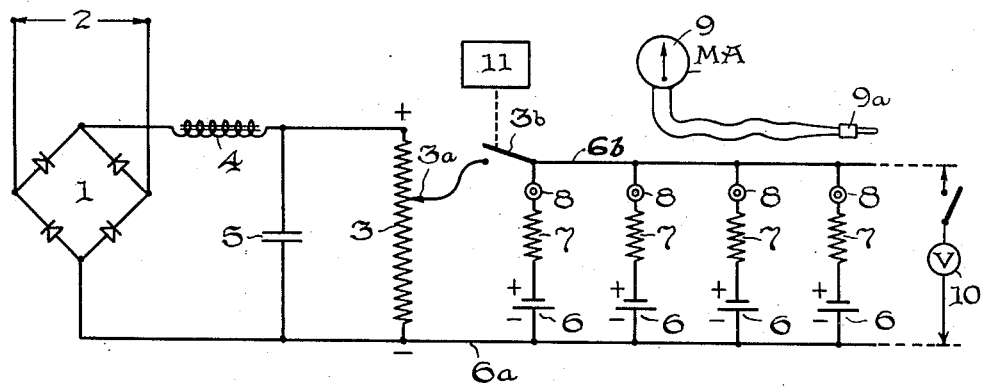
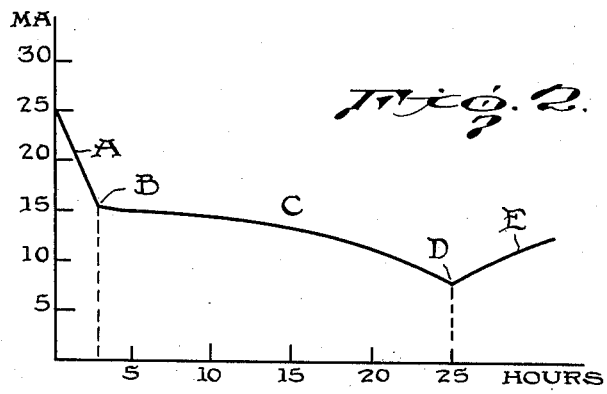
INVENTOR.
ROBERT N. EUBANK
BY
Ralph B. Stewart
ATTORNEY Patented Feb. 6, 1945

2,369,033

UNITED STATES PATENT OFFICE 2,369,033

METHOD OF RECONDITIONING DRY CELLS

Robert N. Eubank, Richmond, Va.

Application April 12, 1943, Serial No. 482,751

7 Claims. (Cl. 320—4)

My invention relates to a method of reconditioning or restoring electric batteries of the so-called "dry cell" type.

My invention is particularly concerned with restoring dry cells of the type wherein the active ingredients are contained within a zinc casing which forms the negative electrode, and a carbon rod forms the positive electrode. Cells of this type usually include a depolarizing material, such as manganese dioxide.

It is common knowledge that dry cells have a limited life, and in a large percentage of cases, the zinc container is still in good condition after the battery becomes exhausted or useless. In normal times, such cells are discarded and replaced by new cells. In times of war, this practice involves a serious waste of valuable materials such as zinc, and my invention will make is possible to eliminate most of this waste.

I do not know the exact reason why the cells become useless before the zinc casing is consumed or becomes in bad condition, but it seems possible that some chemical action is responsible for the limited life of the battery. Others have proposed to prolong the life of dry cells by subjecting these cells to the action of an electric current passed through the cell in reverse direction. One explanation that has been offered of the restoring action is that during normal use of the battery, the manganese dioxide changes into manganese monoxide, and when this process is continued to a certain extent the battery becomes useless. Upon sending a reverse current through the cell, it is claimed that the maganese monoxide is re-oxidized and converted into manganese dioxide, thus restoring the depolarizer for further use. I am not prepared to affirm or deny this theory, but my experience in reconditioning a large number of cells has led me to believe that the restoring process may involve something more than restoring of the depolarizer. I have found evidences indicating that some of the zinc electrode may be restored in the process.

I do not claim to be able to restore a dry cell or battery regardless of its condition, but where a battery is capable of being restored to a certain extent, I find that in using my restoring process, the battery improves up to a certain point with repeated restoring operations. Also, I find that the useful life of a battery freshly bought from the dealer may be prolonger by treatment of the battery according to my method.

As a result of many tests on a large number of cells, I have discovered that the restoring action is not dependent upon any particular value of reverse current passing through the cell. It is important to make certain that the current is flowing in the proper direction, and the only limitation as to value is that it shall not be so large as to damage the battery or cause undue heating of the battery.

Another important point in my process is the time of application of the reverse current. A third important point is that I have discovered that the battery should be allowed to stand idle or "age" for a period of from twenty-four to forty-eight hours after the period of application of the restoring current, and before the battery is placed into service. They should be placed in service as soon after forty-eight hours of aging as possible; if not placed in service, a normal load should be put on them for five minutes each twenty-four hours or a part of the service will be lost.

Suitable apparatus for carrying out my method is represented in the accompanying drawing in which Figure 1 is a circuit diagram illustrating a suitable restoring circuit; and Figure 2 is a typical curve illustrating the variation in value of the restoring current during the restoring period.

Referring to Figure 1, a suitable restoring circuit is shown as consisting of a rectifier bridge 1, preferably formed of dry rectifier elements such as copper oxide units, and is supplied from an alternating current supply circuit 2. A potentiometer 3 is connected to the D. C. output circuit of the rectifier, and a suitable filter consisting of a series inductance 4 and a shunt capacity 5 may be included in this circuit if desired, however, the filter is not necessary. Where possible, I prefer to restore the cells individually in separate parallel circuits, but the cells may be supplied in series circuit relation as will be explained below. Where a series connection is used, the operation is more efficient where all cells have received similar discharge service. In Figure 1 I have shown four individual cells 6 connected in parallel circuits between conductor 6a connected to the negative terminal of potentiometer 3 and conductor 6b connected to the potentiometer sliding contact 3a through a switch 3b. Each cell circuit also includes a series resistance 7 and a jack 8 by which a current measuring instrument such as a milliammeter 9 may be plugged into the various cell circuits by the plug 9a. A voltmeter 10 may be provided to indicate the voltage across supply conductors 6a and 6b. Resistance 7 may have a value from 20 to 30 ohms where it is connected in series with one cell, and the value of this resistance may be increased in proportion to the number of cells connected in series with the resistance. Resistances 7 should all have substantially the same value within 10% variation.

Before undertaking to restore the cells, they should be inspected as to their condition. Any of the following characteristics may indicate a cell of doubtful capacity to be restored:

Insulating casing binds and will not slip.
Cell is swelled or bulging.
Holes in zinc casing.
Signs of chemical action on casing from within.
Cells which pass less than .001 ampere restoring current at restoring voltage given later.
Cell which has been discharged below, or left to stand after discharge until its residual voltage under normal load is less than 10% of original voltage.
Cell shows less than ¼ ampere instantaneous reading on 0-10 ammeter.
Cell shows less than $\frac{1}{10}$ volt instantaneous reading on 1000 ohm voltmeter, open circuit voltage or $\frac{1}{10}$ volt under normal load.

It will be understood that the above test is not absolute, and it may be found that cells showing one or more of the above listed characteristics will be capable of being restored. Generally, it will be found that the cells which are worth restoring do not have any of the above characteristics, although the question of whether to attempt to restore a battery of questionable condition will depend upon the scarcity of batteries.

My method involves the following procedure:

After the batteries have been selected as indicated above, they are connected in the circuit as shown in Figure 1, care being taken to connect the batteries so that current from potentiometer 3 flows through the batteries in reverse direction. With switch 3b open, a reading is taken on voltmeter 10 which indicates the average voltage of the batteries connected between conductors 6a and 6b. Switch 3b is now closed, and contact 3a is adjusted until the voltmeter 10 indicates a voltage in excess of the first reading by 0.1 to 0.25 volts per cell of the battery 6. For example, if battery 6 is a single cell battery, the increase in voltage applied from potentiometer 3 would be from 0.1 to 0.25 volt. If the battery should contain two cells connected in series, the increase in voltage would be from 0.2 to 0.5 volt. It will be understood that where a number of batteries are restored in parallel as in Figure 1, all of the batteries must have the same number of cells and substantially the same new voltage rating, but need not show the same individual voltage at the time of being connected in the circuit. Switch 3b may now be closed, and milliammeter 9 may be plugged into each battery circuit to check the direction and value of current flowing.

I have discovered that the restoring process does not require any particular value of reverse current through the cell, and a current of only a few milliamperes is sufficient. In order to avoid any unnecessary waste of power, I prefer to use low current values. The restoring current may have a value as high as 50 milliamperes without bad effects, but the current should not be high enough to cause any appreciable heating of the battery since this seems to tend to dry out the battery with damaging effect. The amount of current which is permissible without causing appreciable heating will vary with the size of the battery, the smaller sizes requiring less current. Recommended values of restoring current for different sizes of batteries at the beginning of the restoring operation are as follows: No. 6 battery, 15 to 25 ma.; F size, 10 to 15 ma.; D size, 7 to 10 ma.; C size, 5 to 10 ma.; fountain pen size, 5 to 7½ ma.; smaller sizes and "B battery" cells, not more than 5 ma.

For the most efficient restoring of the batteries, a record should be kept of the restoring current flowing in each battery circuit at regular intervals. From the data taken from a great number of tests, I have found that the mean value of the restoring current over the restoring period varies substantially in accordance with the curve shown in Figure 2. It will be understood, however, that the instantaneous value of the restoring current at any given time may vary from the curve shown in Figure 2, and this curve shows the general trend of the current variation during the restoring period. In Figure 2 the current is indicated in milliamperes and the restoring time in hours. As will be seen, the curve consists of three portions A, C and E. During the initial part of the restoring period, the restoring current drops rather quickly from the initial value to some lower value along the portion A. The steepness of this portion will depend upon the initial condition of the battery, that is, it will depend upon to what extent the cell was discharged and how long the cell had been out of service. Portion A is steeper for cells having greater residual capacity and it becomes less steep the longer the cell has been out of service.

At the point B on the curve something happens which changes the rate of change of the means current value, and as the restoring operation proceeds the current varies generally in accordance with the portion C. Portion C in Figure 2 is shown as decreasing continuously from the point B to the point D, but I have observed that in some cases this portion of the curve might first rise after the point B and then drop down to the point D. The amount of change in value of the current along portion C is also dependent upon the past history of the battery or cell, and generally a battery in good condition will show less change in current value over this part of the curve than a battery in poor condition. At the point D, some change occurs in the battery which causes the restoring current to begin to rise along the portion E. I do not know the explanation for the two points of inflection B and D in the current curve, but my tests of the batteries have demonstrated that these points are characteristic. Furthermore, I have discovered that point D is a critical point, and the restoring process should not be carried beyond this point for greatest efficiency. I further find that point D uniformly occurs 22 hours after the point B, and if the restoring process is continued beyond the point D, the efficiency of the battery is impaired and less energy is obtained from the battery on discharge than where the restoring process is stopped at the point D or even somewhat before the point D.

By plotting the current values as the restoring operation progresses, or by indicating these values on a suitable current recorder, the time of occurrence of the point B may be noted for each battery; then each battery should be removed from the charging circuit at or slightly before the time the point D is reached. For greatest efficiency, the restoring current should be continued in each cell for 22 hours after point B has been reached. Since the amount of time required to reach point B will vary and depend upon the previous history of the battery, the total time of the restoring period will not be the same for all batteries, unless they happen to be identical.

The next important step in my method is that the batteries should be allowed to stand idle for a period of from approximately 24 hours to 48 hours. This aging period is important, because I have discovered that if the battery is placed into service immediately after being restored, the voltage drops fairly quickly to a low value and the battery is incapable of performing its normal work. On the other hand, by allowing the battery to "age" for the rest period, I have discovered that the amount of energy which may be obtained from the battery is greatly increased. This can be verified by testing the battery at intervals during the rest period by the ordinary battery current meter.

While the curve shown in Figure 2 represents the characteristic restoring current for most dry cells, I have discovered an occasional battery which shows a rise in current in the initial restoring period and then a drop down to the point B. Also, I have found some batteries which show two "dips" B, and the most pronounced is the critical dip.

My restoring process does not involve a recharging of the battery, and this is shown by the fact that more energy is obtained from the battery on discharge than was put into the battery by the restoring process. For example, I have found that where the restoring process consumed only 0.3 ampere hours, the battery output on discharge amounted to 1.25 ampere hours. Since the current values required for restoring the battery is extremely small, the cost of current is correspondingly small.

The available ampere hours on discharge of the battery varies inversely with the restoring current if the battery is capable of being reconditioned, that is, the available ampere hours increases as the restoring current decreases, but there is a sharp decrease in available ampere hours if the restoring process is continued beyond the 22 hour period after the point B in Figure 2. The available ampere hours may be quickly checked by taking instantaneous current readings on the battery by the ordinary battery tester.

I find that even in the case of a new battery of ordinary shelf life, the ampere hours which may be obtained from the battery may be increased as much as 25% by restoring the battery according to my method before putting the battery into service. This increase in output brings the battery to within 10% of the ampere hours which could be obtained from the battery if it were placed in use immediately after being shipped from the factory.

I find that the operation of a battery improves with the second restoring treatment. On first treatment, I have found that it is possible to get as high as 80% of the normal battery life out of the battery, and on the second restoring operation I have obtained an output on discharge as much as 22% above the output obtained on the original discharge of the battery. On the third and subsequent restoring operations, the available energy on discharge decreases gradually and this is probably due to the using up of the essential materials in the battery. I have been able to successfully recondition or restore batteries for as many as ten restoring and discharging cycles before they become unfit for further use. Better results are obtained if the cell is restored immediately after being run down.

In an actual test on type F four-cell batteries used for railway service, I have been able to obtain from 22 to 28 hours additional service from batteries which had been out of service for six months and were no longer usable. The normal life of new cells of this type in this service was 35 hours. On the same types of batteries which had been out of service for the same period, I found that after a first restoration period, the batteries would give from 15 to 20 hours useful life on a continuous run-down test as compared with 23 hours for a new battery.

The voltage of the battery rises during the restoring operation, and the voltage may be used as a rough indication of whether or not the battery is responding to the treatment. If at the end of the first treatment it is found that the battery voltage has not come up to normal, the battery should be allowed to stand idle for the rest period and then should be subjected to another restoring treatment. I have found that it may take as many as three or four treatments before some batteries can be restored to a sufficient extent to be placed in useful service. This is worthwhile when batteries are scarce. Cells may be taken off when the voltage under normal load reaches 1.4 to 1.55 per cell.

While for maximum efficiency, the restoring operation should be stopped at the end of 22 hours after the first "dip" in the restoring current curve, this would require individual attention to each battery which might not be warranted. In practice I have found that very good results may be obtained by simply subjecting the batteries to a restoring current for a total period not exceeding 22 hours, and without indicating readings of the restoring current on the individual batteries. The restoring operation is followed by the rest period before the batteries are placed in service. In order to avoid the necessity for watching the batteries closely, the switch 3b may be a time switch which when closed automatically opens after a set period, say from 20 to 22 hours. For this purpose, switch 3b may be embodied in a well known electric time clock switch which can be adjusted to remain closed for a predetermined period and then moved to open position. The details of the clock mechanism are not important, since various constructions may be used.

It will be obvious that other circuit arrangements may be used for carrying out my restoring method.

I claim:

1. The method of restoring dry batteries which consists in passing a reverse current of not more than fifty milliamperes through the battery from a source of substantially constant voltage for a period of substantially 20 hours while limiting the value of the reverse current to a value within the range of five to fifty milliamperes to prevent appreciable heating of the battery, and allowing the battery to stand idle for a period of 24 to 48 hours before placing the battery into service.

2. The method of restoring dry batteries which consists in passing a reverse current having a value within the range of five to fifty milliamperes through each cell of the battery from a source of substantially constant voltage for a period of substantially 20 hours, allowing the battery to stand idle for a period of the order of 36 hours, and repeating the foregoing cycle until the battery voltage is restored to substantially normal value.

3. The method of restoring dry batteries which consists in passing a reverse current of not more than fifty milliamperes through each cell of the battery from a source of substantially constant voltage, recording the variation in value of said current, and continuing said current for substantially 20 but not more than 22 hours following the first major inflection point in the current curve.

4. The method of restoring dry batteries which consists in passing a reverse current of not more than fifty milliamperes through each cell of the battery from a source of substantially constant voltage, recording the variation in value of said current, discontinuing said current at the expiration of from 15 to 22 hours after the first major inflection point in the current curve, and allowing the battery to stand idle for a period of 24 to 48 hours before placing the battery in service.

5. A method of restoring dry batteries which consists in passing a reverse current of not more than fifty milliamperes through each cell of the battery from a source of substantially constant voltage having a value in excess of the voltage of said battery by 0.1 to one-quarter volt per cell of the battery, continuing said current for a period of 15 to 22 hours, discontinuing said current and allowing the battery to stand idle for a period of the order of 36 hours, and repeating the foregoing cycle until the voltage of said battery has been restored to substantially normal value.

6. The method of restoring dry batteries which consists in passing a reverse current of from five to thirty milliamperes through each cell of the battery from a source of substantially constant voltage for a period of substantially twenty hours, and allowing the battery to stand idle for a period of the order of twenty-four hours before placing the battery into service.

7. The method of restoring dry batteries which consists in passing a reverse current of from five to thirty milliamperes through each cell of the battery from a source of substantially constant voltage for a period of substantially twenty hours, allowing the battery to stand idle for a period of the order of tyenty-four hours, and repeating the foregoing cycle until the voltage of the battery is restored to substantially normal value.

ROBERT N. EUBANK.